United States Patent [19]
Imai et al.

[11] Patent Number: 5,128,416
[45] Date of Patent: Jul. 7, 1992

[54] MODIFIED DIENE POLYMER RUBBERS

[75] Inventors: Akio Imai; Tomoaki Seki; Keisaku Yamamoto, all of Ichihara, Japan

[73] Assignee: Sumitomo Chemical Company, Limited, Osaka, Japan

[21] Appl. No.: 581,163

[22] Filed: Sep. 5, 1990

Related U.S. Application Data

[63] Continuation of Ser. No. 343,558, Apr. 27, 1989, abandoned.

[30] Foreign Application Priority Data

| | | |
|---|---|---|
| May 2, 1988 [JP] | Japan | 63-109454 |
| May 10, 1988 [JP] | Japan | 63-114468 |
| May 10, 1988 [JP] | Japan | 63-114469 |
| May 12, 1988 [JP] | Japan | 63-115372 |
| May 12, 1988 [JP] | Japan | 63-115373 |

[51] Int. Cl.$^5$ .................................... C08F 8/30
[52] U.S. Cl. ........................ 525/254; 525/246
[58] Field of Search ..................... 525/254, 246

[56] References Cited

U.S. PATENT DOCUMENTS

| | | | |
|---|---|---|---|
| 3,244,664 | 4/1966 | Zelinski et al. | 260/41.5 |
| 3,264,374 | 8/1966 | Jones | 525/296 |
| 3,322,738 | 5/1967 | Uraneck et al. | 260/84.7 |
| 3,692,874 | 9/1972 | Farrar et al. | 525/254 |
| 3,725,369 | 4/1973 | Halasa et al. | 525/254 |
| 4,086,298 | 4/1978 | Fahrbach et al. | 525/254 |
| 4,148,838 | 4/1979 | Martin | 260/825 |
| 4,647,625 | 3/1987 | Aonuma et al. | 525/296 |

FOREIGN PATENT DOCUMENTS

| | | |
|---|---|---|
| 0252992 | 1/1988 | European Pat. Off. |
| 0270071 | 6/1988 | European Pat. Off. |

OTHER PUBLICATIONS

Patent Abstracts of Japan, vol. 11, No. 322 (C-453) (2769), Oct. 20, 1987 and JP-A-62 109 801 (Japan Synthetic Rubber Co. Ltd.) May 21, 1987.

Jones, G. D. et al. "Water-Soluble Photocurable Elastomer." *Journal of Applied Polymer Science*, vol. 23 (1979) pp. 115-122.

*Primary Examiner*—Bernard Lipman
*Attorney, Agent, or Firm*—Armstrong & Kubovcik

[57] ABSTRACT

A process for preparing modified diene polymer rubbers having an increased impact resilience, a reduced hardness at low temperatures and an improved processability, and useful as rubber materials for automobile tires and other industries which comprises producing a conjugated diene polymer having alkali metal end or ends, and reacting the alkali metal-containing polymer with (a) a silicon or tin compound of the formula: $R_aMX_b$ wherein R is an alkyl group, an alkenyl group, a cycloalkenyl group or an aromatic hydrocarbon group, M is silicon atom or tin atom, X is a halogen atom, a is 0, 1 or 2 and b is 2, 3 or 4, and (b) at least one member selected from the group consisting of a nitro compound; a phosphoryl chloride compound of the formula (1):

$$\begin{array}{c} R^1 \\ \diagdown \\ R^2 \end{array} N - \underset{\underset{O}{\overset{\|}{P}}}{\overset{Cl}{|}} - N \begin{array}{c} R^3 \\ \diagup \\ R^4 \end{array} \qquad (1)$$

wherein $R^1$, $R^2$, $R^3$ and $R^4$ are an alkyl group; an aminosilane compound of the formula (2):

$$R^5 - \underset{\underset{R^7}{\overset{R^6}{|}}}{\overset{}{Si}} - (CH_2)_n - N \begin{array}{c} R^8 \\ \diagup \\ R^9 \end{array} \qquad (2)$$

wherein $R^5$, $R^6$ and $R^7$ are an alkyl group or an alkoxyl group, $R^8$ and $R^9$ are an alkyl group, and n is an integer; an acrylamide compound of the formula (3):

$$CH_2 = \underset{\underset{}{\overset{R^{10}}{|}}}{C} - \underset{\underset{O}{\overset{\|}{C}}}{} - NH - C_mH_{2m} - N \begin{array}{c} R^{11} \\ \diagup \\ R^{12} \end{array} \qquad (3)$$

wherein $R^{10}$ is hydrogen atom or methyl group, $R^{11}$ and $R^{12}$ are an alkyl group, and m is an integer; and an aminovinylsilane compound of the formula (4):

$$CH_2 = CH - \underset{\underset{R^{13}}{\overset{}{|}}}{Si} - N \begin{array}{c} R^{14} \\ \diagdown \\ N \\ \diagup \\ R^{15} \end{array} \begin{array}{c} \\ R^{16} \\ \diagup \\ R^{17} \end{array} \qquad (4)$$

wherein $R^{13}$, $R^{14}$, $R^{15}$, $R^{16}$ and $R^{17}$ are an alkyl group.

6 Claims, No Drawings

MODIFIED DIENE POLYMER RUBBERS

This application is a continuation of application Ser. No. 343,558 filed Apr. 27, 1989, now abandoned.

BACKGROUND OF THE INVENTION

The present invention relates to modified diene polymer rubbers having an improved impact resilience, a low hardness at low temperatures and an improved processability. More particularly, the present invention relates to a process for preparing modified elastomeric polymers of conjugated diene compounds by introducing particular atomic groups to conjugated diene polymers, and a rubber composition containing the same.

Conjugated diene polymers such as polybutadiene and a styrene-butadiene copolymer have hitherto been used as rubbers for automobile tire treads. In recent years, from the viewpoint of demands in low fuel cost for automobiles and in running safety on snow and ice roads, rubber materials having a low rolling resistance and a large grip force on ice and snow roads have been desired as rubbers for automobile tire treads.

The rolling resistance is correlative to the impact resilience of polymers. The rolling resistance is decreased with increasing the impact resilience. On the other hand, it is known that the grip force on snow and ice roads is correlative to the hardness at low temperatures, and that the smaller the hardness at low temperatures, the larger the grip force on snow and ice roads. Known rubber materials are not satisfactory in these properties for practical use.

It was found that conjugated diene polymers having an increased impact resilience and a decreased low temperature hardness could be obtained when particular atomic groups were introduced to polymers by reacting alkali metal-containing diene polymers with particular compounds such as a nitro compound, a phosphoryl chloride compound, an aminosilane compound, an acrylamide compound and an aminovinylsilane compound. However, the conjugated diene polymers so modified by using the particular compounds have the defect detrimental to the practical use that they are poor in processability as represented by winding on roll.

It is an object of the present invention to provide a conjugated diene rubber having an improved processability as well as an improved impact resilience and a low hardness at low temperatures.

A further object of the present invention is to provide a process for modifying a conjugated diene polymer to improve the impact resilience and the processability and to lower the hardness under an atmosphere of low temperatures.

A still further object of the present invention is to provide a conjugated diene rubber composition having an improved processability and an improved storability and capable of providing a cured product improved in impact resilience and in hardness at low temperatures.

These and other objects of the present invention will become apparent from the description hereinafter.

SUMMARY OF THE INVENTION

It has now been found that the above-mentioned objects can be achieved by reacting an alkali metal-containing conjugated diene polymer with the above-mentioned particular compound to thereby introduce a particular atomic group to the diene polymer, and a particular tin or silicon compound to thereby couple the polymer chains.

In accordance with the present invention, there is provided a process for preparing a modified diene polymer which comprises reacting an alkali metal-containing conjugated diene polymer with (a) a silicon or tin compound of the formula: $R_aMX_b$ wherein R is an alkyl group, an alkenyl group, a cycloalkenyl group or an aromatic hydrocarbon group, M is silicon atom or tin atom, X is a halogen atom, a is 0, 1 or 2 and b is 2, 3 or 4, and (b) at least one member selected from the group consisting of a nitro compound; a phosphoryl chloride compound of the formula (1):

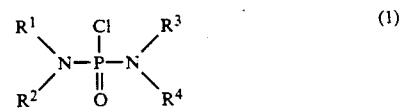

wherein $R^1$, $R^2$, $R^3$ and $R^4$ are an alkyl group; an aminosilane compound of the formula (2):

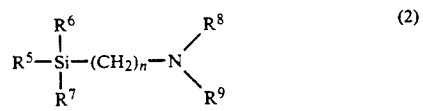

wherein $R^5$, $R^6$ and $R^7$ are an alkyl group or an alkoxyl group, $R^8$ and $R^9$ are an alkyl group, and n is an integer; an acrylamide compound of the formula (3):

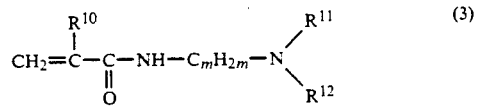

wherein $R^{10}$ is hydrogen atom or methyl group, $R^{11}$ and $R^{12}$ are an alkyl group, and m is an integer; and an aminovinylsilane compound of the formula (4):

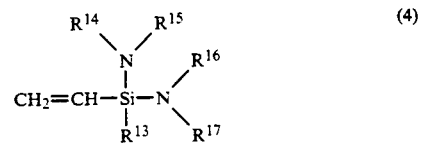

wherein $R^{13}$, $R^{14}$, $R^{15}$, $R^{16}$ and $R^{17}$ are an alkyl group, said alkali metal-containing conjugated diene polymer being a living polymer having an alkali metal end prepared by a polymerization of a conjugated diene monomer or a mixture of a conjugated diene monomer and an aromatic vinyl monomer in a hydrocarbon solvent in the presence of an alkali metal-based catalyst, or a diene polymer to which an alkali metal is introduced by an addition reaction of a diene polymer having conjugated diene units in the polymer chain and an alkali metal-based catalyst in a hydrocarbon solvent.

The present invention also provides a rubber composition comprising the modified diene polymer and rubber additives. The composition has an improved processability and an improved storability as well as an improved impact resilience and a low hardness at low temperatures.

DETAILED DESCRIPTION

The term "alkali metal-containing conjugated diene polymer" as used herein means a living diene polymer wherein an alkali metal is bonded to the diene polymer end or ends, obtained by polymerizing a conjugated diene monomer or a mixture of the diene monomer and other monomers copolymerizable with the diene monomer in a hydrocarbon solvent in the presence of an alkali metal-based catalyst; and a diene polymer obtained by addition of an alkali metal to a diene polymer having units of a conjugated diene in the polymer chain which has been previously prepared without being bound to the polymerization method, for example, by a solution polymerization method or an emulsion polymerization method.

The diene polymers used in the present invention include, for instance, homopolymers or copolymers of conjugated diene monomers such as 1,3-butadiene, isoprene, 1,3-pentadiene (piperylene), 2,3-dimethyl -1,3-butadiene, 1-phenyl-1,3-butadiene and 1,3-hexadiene, and copolymers of the con3ugated diene monomers and other monomers copolymerizable therewith, e.g. aromatic vinyl compounds such as styrene, m- or p-methylstyrene, p-t-butylstyrene, α-methylstyrene, vinyltoluene, vinylnaphthalene, divinylbenzene, trivinylbenzene and divinylnaphthalene; unsaturated nitrile compounds such as acrylonitrile; acrylic acid esters and methacrylic acid esters; vinylpyridine; and the like. The diene polymers usable in the invention are not limited to these exemplified polymers. Representative examples of the diene polymers are, for instance, polybutadiene rubber, polyisoprene rubber, butadiene-isoprene copolymer and butadiene-styrene copolymer.

The diene polymer wherein an alkali metal is bonded to the diene polymer end or ends is, as mentioned above, those obtained by a polymerization using an alkali metal-based catalyst, and is living polymers having an alkali metal on at least one end of the polymer chain in the stage prior to terminating the polymerization. For instance, the living diene polymer can be prepared by a known living anionic polymerization method wherein monomer or monomers are polymerized in the presence of an alkali metal-based catalyst such as an organolithium initiator in a hydrocarbon solvent. Generally used chemicals such as alkali metal-based catalysts, polymerization solvents, randomizers and controlling agents for the microstructure of conjugated diene units can be used in the preparation of the living diene polymers. The polymerization manner is not particularly limited. Polar compounds are used as the randomizer or the microstructure controlling agent, and the amount thereof is usually from 0.1 to 10 moles, preferably 0.5 to 2 moles, per mole of the alkali metal-based catalyst.

The alkali metal addition diene polymer is prepared from diene polymers obtained by polymerizing the conjugated diene monomer or a mixture thereof with other copolymerizable monomers in a usual polymerization manner, e.g. a solution polymerization using an alkali metal-based catalyst, an alkaline earth metal-based catalyst or a Ziegler catalyst, or an emulsion polymerization using a redox catalyst. Representative examples of the starting diene polymers are, for instance, polybutadiene rubber, polyisoprene rubber, butadiene-styrene copolymer rubber, butadiene-isoprene copolymer rubber, polypentadiene rubber, butadiene-piperylene copolymer rubber, and butadiene-propylene alternate copolymer. An alkali metal is introduced to the diene polymers by an addition reaction of the diene polymers and alkali metal-based catalysts.

The addition of the alkali metal to the diene polymers is carried out by usually adopted methods. For instance, the diene polymer is reacted with a usual alkali metal-based catalyst in a hydrocarbon solvent in the presence of a polar compound such as an ether compound, an amine compound or a phosphine compound at a temperature of 30° to 100° C. for tens of minutes to tens of hours, especially 10 minutes to 60 hours. The amount of the alkali metal-based catalyst is usually from 0.1 to 10 millimoles per 100 g of the diene polymer. When the amount is less than 0.1 millimole, the impact resilience is not improved. When the amount is more than 10 millimoles, a side reaction such as crosslinking or severance of the polymer occurs, thus resulting in no contribution to improvement of impact resilience. The amount of the polar compound is usually from 0.1 to 10 moles, preferably from 0.5 to 2 moles, per mole of the alkali metal-based catalyst.

The alkali metal-based catalyst used in the living polymerization and the addition reaction includes, for instance, lithium, sodium, potassium, rubidium and cesium metals, hydrocarbon compounds of these metals, and complexes of these metals with polar compounds.

Lithium or sodium compounds having 2 to 20 carbon atoms are preferable as the catalyst. Representative examples thereof are, for instance, ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenyl-butyllithium, cyclohexyllithium, 4-cyclopentyllithium, 1,4-dilithio-butene-2, sodium naphthalene, sodium biphenyl, potassium-tetrahydrofuran complex, potassium diethoxyethane complex, and sodium salt of α-methylstyrene tetramer. The catalysts may be used alone or as an admixture thereof.

The polymerization reaction and the alkali metal addition reaction for preparing the alkali metal-containing conjugated diene polymers are carried out in a hydrocarbon solvent, or in a solvent which does not destroy the alkali metal-based catalysts, e.g. tetrahydrofuran, tetrahydropyran or dioxane.

The hydrocarbon solvent is suitably selected from aliphatic hydrocarbons, aromatic hydrocarbons and alicyclic hydrocarbons. Hydrocarbons having 2 to 12 carbon atoms are particularly preferred as the solvent. Preferable examples of the solvent are, for instance, propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene, and ethylbenzene. The solvents may be used alone or as an admixture thereof.

The silicon or tin compounds to be reacted with the alkali metal-containing conjugated diene polymer, represented by the formula: $R_aMX_b$ wherein R is an alkyl group, an alkenyl group, a cycloalkenyl group or an aromatic hydrocarbon group, M is silicon atom or tin atom, X is a halogen atom, a is 0, 1 or 2, and b is an integer of 2 to 4, serve as the coupling agent for the diene polymer. The silicon or tin compounds are used in an amount such that the halogen atom of the compound is present in a proportion of 0.2 to 3 equivalents per equivalent of the terminal alkali metal atom of the alkali metal-containing diene polymer. The coupling reaction can be carried out in a known manner. Usually the coupling agent is added to the reaction mixture obtained by the living polymerization or the alkali metal addition reaction. The coupling reaction is carried out at a temperature of 50° to 120° C.

Representative examples of the silicon compound are, for instance, silicon tetrachloride, silicon tetrabromide, trichloromethylsilane, trichlorobutylsilane, dichlorodimethylsilane, 1,2-bis(trichlorosilyl)ethane, and the like.

Representative examples of the tin compound are, for instance, tin tetrachloride, tin tetrabromide, methyltin trichloride, butyltin trichloride, tin dichloride, bistrichlorosilyl tin, and the like.

The silicon compounds and the tin compound may be used alone or in admixture thereof.

The alkali metal-containing diene polymer prepared by the living polymerization or the addition reaction is reacted with the above-mentioned coupling agent and at least one terminal modifier selected from a nitro compound having a nitro group in its molecule, a phosphoryl chloride compound of the formula (1):

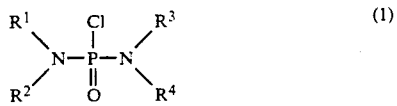

wherein $R^1$, $R^2$, $R^3$ and $R^4$ are an alkyl group; an aminosilane compound of the formula (2):

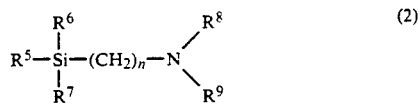

wherein $R^5$, $R^6$ and $R^7$ are an alkyl group or an alkoxyl group, $R^8$ and $R^9$ are an alkyl group, and n is an integer; an acrylamide compound of the formula (3)

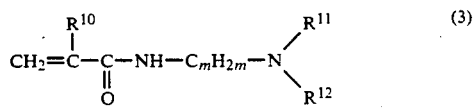

wherein $R^{10}$ is hydrogen atom or methyl group, $R^{11}$ and $R^{12}$ are an alkyl group, especially an alkyl group having 1 to 4 carbon atoms, and m is an integer, preferably an integer of 2 to 5; and an aminovinylsilane compound of the formula (4):

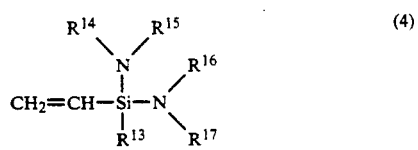

wherein $R^{13}$, $R^{14}$, $R^{15}$, $R^{16}$ and $R^{17}$ are an alkyl group, especially an alkyl group having 2 to 5 carbon atoms.

Representative examples of the nitro compound are given below.

(1) Aliphatic nitro compound:

mononitroparaffin such as nitromethane, nitroethane, 1-nitropropane, 2-nitropropane, 1-nitro-n-butane, 2-nitro-n-butane, 2-methyl-1-nitrobutane, 3-methyl-1-nitrobutane, 2-methyl-2-nitrobutane, 1-nitro-n-hexane, 1-nitro-n-heptane, 1-nitro-n-octane, or 2-nitro-n-octane; mononitroolefin such as nitroethylene, 1-nitro-1-propene, 2-nitropropene, 3-nitro-1-propene, 1-nitro-1-butene, 2-nitro-2-butene, 1-nitro-2-methyl-1-propene, 2-nitro-1-butene, 2-nitro-1-pentene, 3-nitro 1,3pentadiene, 2-nitro-3-methyl-1,3-butadiene, 1-nitro-4-methyl-1-pentene, 2-nitro-1-hexene, 2-nitro-1-heptene, 1-nitro-1-octene, or 1-nitro-2,4,4-trimethyl-1-octene; monohalonitroparaffin such as chloronitromethane, bromonitromethane, 1-chloro-1-nitroethane, 1-bromo-1-nitroethane, 2-chloro-1-nitroethane, 1-chloro-1-nitropropane, 1-bromo-1-nitropropane, 2-chloro-1-nitropropane, 3-chloro-1-nitropropane, 1-chloro-2nitropropane, 1-bromo-2-nitropropane, 2-chloro-2-nitropropane, 1,1-dichloro-1-nitroethane, 1,1-dibromo-1nitroethane, 1,1-dichloro-1-nitropropane, 1,1-dibromo-1nitropropane, chloropicrin, or bromopicrin; mononitroether such as methyl-2-nitroethyl ether, ethyl-2-nitroethyl ether, 2-nitroethyl-n-propyl ether, 2-nitroethyl isopropyl ether, n-butyl-2-nitroethyl ether, methyl-2-nitroisopropyl ether, 3-methoxy-2-nitrobutane, methyl-2-nitropropyl ether, n-butyl-2-nitroisopropyl ether, or ethylnitro-tertbutyl ether; mononitroketone such as nitroacetone, 4,4-dimethyl-5-nitro-2-pentanone, or methyl-2-nitroethyl ketone; dinitroparaffin such as 1,1-dinitroethane, 1,1-dinitropropane, 2,2-dinitropropane, 1,1-dinitropentane, 3,3-dinitropentane, 1,2-dinitroethane, 1,2-dinitropropane, 1,2-dinitrobutane, 2,3-dinitrobutane, 2-methyl-2,3-dinitropropane, 2,3-dimethyldinitrobutane, 1,3-dinitropropane, 1,4-dinitrobutane, 1,5-dinitropentane, 1,6-dinitrohexane, 2,2-dimethyl-1,3-dinitropropane, tetrachloro-1,2-dinitroethane, or tetrabromo-1,2-dinitroethane; dinitroolefin such as 2,3-dinitro-2-butene or 3,4-dinitro-3-hexene; other polynitro compounds such as trinitromethane, 1,1,1-trinitroethane, chlorotrinitromethane, bromotrinitromethane, iodotrinitromethane, tetranitromethane, or hexanitroethane, and the like (2) Alicyclic nitro compound:

nitrocyclopentane, 1-methyl-1-nitrocyclopentane, 1-methyl-2-nitrocyclopentane, cyclopentylnitromethane, nitrocyclohexane, 1-methyl-1-nitrocyclohexane, 2-methyl-1-nitrocyclohexane, 4-methyl-1-nitrocyclohexane, 1,2-dimethyl-1-nitrocyclohexane, 1,3-dimethyl-1-nitrocyclohexane, 1,4-dimethyl-1-nitrocyclohexane, 1-bromo-1-nitrocyclohexane, 1,2-dinitrocyclohexane, 1-nitromethylcyclohexane, 1-nitromethylcyclohexene, and the like (3) Aromatic nitro compound:

nitrobenzene, 1-chloro-3-nitrobenzoyl chloride, p-nitrophenyl-trifluoroacetate, o-dinitrobenzene, m-dinitrobeneze, 1,5-difluoro-2,4-dinitrobenzene, 3,5-dinitrobenzoyl chloride, p-dinitrobenzene, 1,2,3-trinitrobenzene, 1,2,4-trinitrobenzene, 1,3,5-trinitrobenzene, 1,2,3,5-tetranitrobenezene, 1,2,4,5-tetranitro-benzene, o-fluoronitrobenzene, m-fluoronitrobenzene, p-fluoronitrobenzene, 1-fluoro-2,4-dinitrobenzene, o-chloronitrobenzene, m-chloronitrobenzene, p-chloronitrobenzene, 1-chloro-2,4-dinitrobenzene, 1-chloro-2,6-dinitrobenzene, 1-chloro-3,4-dinitrobenzene, 1-chloro-2,4,6-trinitrobenzene, 3,4-dichloronitrbenzene, 3,5-dichloronitrobenzene, 2,4-dichloronitrobenzene, 2,5-dichloronitrobenzene, 4,5-dichloro-1,2-dinitrobenzene, 4,6-dichloro-1,3-dinitrobenzene, 2,5-dichloro-1,3-dinitrobenzene, 2,4,5-trichloronitrobenzene, 2-chloro-4-nitrotoluene, 2-chloro-6-nitrotoluene, 4-chloro-2-nitrotoluene, 2-chloro-3,4-dinitrotoluene, 2-chloro-3,5-dinitrotoluene, o-bromonitrobenzene, m-bromonitrobenzene, p-bromonitrobenzene, 1-bromo-2,4-dinitrobenzene, 1-bromo-3,4-dinitrobenzene, 1-bromo-2,4,6- trinitrobenzene, 2,3-dibromonitrobe 3,4-dibromonitrobenzene, 2,4-dibromonitrobenzene, 2,6-dibromonitrobenzene, 4,6-dibromo -1,3-dinitrobenzene, 2,5-dibromo-1,4-dinitrobenzene, 2,4,6-tribromonitrobenzene, 2-bromo-4-nitrotoluene, 2-bromo-5-nitrotoluene, 3-bromo-2-nitrotoluene, 3-bromo-4-nitrotoluene, o-iodonitrobenzene, m-iodonitrobenzene, 1-iodo-2,4-dinitrobenzene, 1-iodo-3,4-dinitrobenzene, 3,4,5-triiodonitrobenzene, 1-nitronaphthalene, 2-nitronaphthalene, dinitronaphthalenes, trinitronaphthalenes, tetranitronaphthalenes, nitromethylnaphthalenes, nitrophenylnaphthalenes, halonitronaphthalenes, halodinitronaphthalenes, 5-nitrotetralin, 6-nitrotetralin, 5,6-dinitrotetralin, 5,7-dinitrotetralin, 5,8-dinitrotetralin, 6,7-dinitrotetralin, 3-nitro-1,2-naphthoquinone, 7-nitro-l,2-naphthoquinone, 3-methyl-2-nitro-1,4-naphthoquinone, 4-chloro-3-nitro -1,2-naphthoquinone, 2,3-dichloro-5-nitro-1,4-naphthoquinone, nitroanthraquinone, dimethyl p-nitrophthalate, 4,4'-dinitrodiphenyl, 4,4'-dinitrodiphenylmethane, ethyl bis(2,4-dinitrophenyl) acetate, and the like (4) Heterocyclic nitro compound:

7-chloro-4-nitrobenzofurazane, 2-chloro -5-nitropyridine, 2,4,5-trinitro-9-fluorene, 2,4,7-trinitro -9-fluorene, tetranitrocarbazole, and the like In the phosphoryl chloride compound of the formula (1), the alkyl groups $R^1$ to $R^4$ are usually those having 1 to 20 carbon atoms.

Representative examples of the phosphoryl chloride compounds (1) are, for instance, bis(dimethylamino)phosphoryl chloride, bis(diethylamino)phosphoryl chloride, bis(dipropylamino)phosphoryl chloride, bis(diisobutylamino)phosphoryl chloride, and the like.

In the aminosilane compound of the formula (2), the alkyl or alkoxyl groups $R^5$ to $R^7$ are usually those having 1 to 20 carbon atoms, and the alkyl groups $R^8$ and $R^9$ are usually those having 1 to 20 carbon atoms. Also, the integer n is usually from 1 to 20.

Representative examples of the aminosilane compound (2) are, for instance, 3-dimethylaminomethyltrimethoxysilane, 3-dimethylaminoethyltrimethoxysilane, 3-dimethylaminopropyltrimethoxysilane, 3-dimethylaminobutyltrimethoxysilane, 3-dimethylaminomethyldimethoxymethylsilane, 3-dimethylaminoethyldimethoxymethylsilane, 3-dimethylaminopropyldimethoxymethylsilane, 3-dimethylaminobutyldimethoxymethylsilane, 3-dimethylaminomethyltriethoxysilane, 3-dimethylaminoethyltriethoxysilane, 3-dimethylaminopropyltriethoxysilane, 3-dimethylaminopropyltriethoxysilane, 3-dimethylaminomethyldiethoxymethylsilane, 3-dimethylaminoethyldiethoxymethylsilane, 3-dimethylaminopropyldiethoxymethylsilane, 3-dimethylaminobutyldiethoxymethylsilane, and the like. 3-Dimethylaminopropyldiethoxymethylsilane is particularly preferable.

Representative examples of the acrylamide compound (3) are, for instance, N,N-dimethylaminomethyl acrylamide, N,N-ethylmethylaminomethyl acrylamide, N,N-diethylaminomethyl acrylamide, N,N-ethylpropylaminomethyl acrylamide, N,N-dipropylaminomethyl acrylamide, N,N-butylpropylaminomethyl acrylamide, N,N-dibutylaminomethyl acrylamide, N,N-dimethylaminoethyl acrylamide, N,N-ethylmethylaminoethyl acrylamide, N,N-diethylaminoethyl acrylamide, N,N-ethylpropylaminoethyl acrylamide, N,N-dipropylaminoethyl acrylamide, N,N-butylpropylaminoethyl acrylamide, N,N-dibutylaminoethyl acrylamide, N,N-dimethylaminopropyl acrylamide, N,N-ethylmethylaminopropyl acrylamide, N,N-diethylaminopropyl acrylamide, N,N-ethylpropylaminopropyl acrylamide, N,N-dipropylaminopropyl acrylamide, N,N-butylpropylaminopropyl acrylamide, N,N-dibuthylaminopropyl acrylamide, N,N-dimethylaminobutyl acrylamide, N,N-ethylmethylaminobuthyl acrylamide, N,N-diethylaminobutyl acrylamide, N,N-ethylpropylaminobuthyl acrylamide, N,N-dipropylaminobutyl acrylamide, N,N-butylpropylaminobutyl acrylamide, N,N-dibutylaminobutyl acrylamide and the corresponding methacrylamide compounds. N,N-dimethylaminopropyl acrylamide and methacrylamide are particularly preferred.

Representative examples of the aminovinylsilane compound (4) are, for instance, bis(dimethylamino)methylvinylsilane, bis(ethylmethylamino)methylvinylsilane, bis(diethylamino)methylvinylsilane, bis(ethylpropyl)methylvinylsilane, bis(dipropylamino)methylvinylsilane, bis(butylpropylamino)methylvinylsilane, bis(dibutylamino)methylvinylsilane, bis(dimethylamino)ethylvinylsilane, bis(ethylmethylamino)ethylvinylsilane, bis(diethylamino)ethylvinylsilane, bis(ethylpropylamino)ethylvinylsilane, bis(dipropylamino)ethylvinylsilane, bis(butylpropylamino)ethylvinylsilane, bis(dibutylamino)ethylvinylsilane, bis(dimethylamino)propylvinylsilane, bis(ethylmethylamino)propylvinylsilane, bis(diethylamino)propylvinylsilane, bis(ethylpropylamino)propylvinylsilane, bis(dipropylamino)propylvinylsilane, bis(butylpropylamino)propylvinylsilane, bis(dibutylamino)propylvinylsilane, bis(dimethylamino)butylvinylsilane, bis(ethylmethylamino)butylvinylsilane, bis(diethylamino)butylvinylsilane, bis(ethylpropylamino)butylvinylsilane, bis(dipropylamino)butylvinylsilane, bis(butylpropylamino)butylvinylsilane, bis(dibutylamino)butylvinylsilane, and the like. Bis(dimethylamino)methylvinylsilane is particularly preferred.

The above-mentioned terminal modifiers may be used alone or as an admixure thereof The amount of the modifier is usually from 0.05 to 10 moles, preferably 0.2 to 2 moles, per mole of the alkali metal-based catalyst used in the living polymerization or alkali metal addition reaction for the production of the alkali metal-containing diene polymers The reaction between the modifier and the alkali metal-containing diene polymer proceeds rapidly. Accordingly, the reaction temperature and the reaction time can be selected from the wide ranges. In general, the reaction is effected at a temperature of from room temperature to 100° C. for several seconds to several hours (about 3 seconds to about 6 hours).

Contacting the alkali metal-containing diene polymer with the modifier is sufficient for the reaction. Usually, the alkali metal-containing diene polymer dissolved in a solvent is mixed with the modifier. For instance, the modification of diene polymers is conducted by a process wherein monomer or monomers are polymerized in a hydrocarbon solvent using an alkali metal-based catalyst, and to the resulting polymer solution is added a prescribed amount of the modifier; or a process wherein a diene polymer solution is subjected to the alkali metal addition reaction, and after the completion of the addition reaction, the modifier is subsequently added to the reaction mixture and the reaction is effected. However, the process for reacting the polymer with the modifier is not limited to these processes.

Thus, by the terminal modification of diene polymers with the modifiers, particular atomic groups derived from the modifiers are introduced to the polymer chain ends, while the polymer chains are coupled by the coupling reaction with the above-mentioned particular tin or silicon coupling agents. The coupling and the terminal modification may be conducted simultaneously, but preferably the coupling reaction is first carried out and then the terminal modification is carried out.

After the completion of the reaction, the modified diene polymer is coagulated from the reaction mixture (solution) by known methods as applied in the preparation of rubbers by a usual solution polymerization, for example, by an addition of a coagulant to the reaction mixture or by a steam coagulation. The coagulation temperature is not particularly limited.

The drying of the polymer crumbs separated from the reaction system can also be effected by usual methods as used in the preparation of usual synthetic rubbers, for example, by a band dryer or a dryer of extrusion type. The drying temperature is not particularly limited.

The modified conjugated diene polymers according to the present invention have improved properties in impact resilience, hardness at low temperatures and processability as compared with nonmodified diene polymers. Accordingly, the modified diene polymers are particularly suitable for use in automobile tires. Further, they can also be used as raw material rubbers for various industrial purposes such as boot and shoe bottom, floor material and vibration-proof rubber. The modified diene polymers can be incorporated with usual rubber additives to provide a rubber composition and cured in a usual manner to provide cured products.

The modified diene polymer according to the present invention may be used alone or in combination with other known rubbers. Examples of the other rubbers are, for instance, emulsion-polymerized styrene-butadiene copolymer, rubbers prepared by solution polymerization using an anionic polymerization catalyst, a Ziegler catalyst, etc., e.g. polybutadiene rubber, styrene-butadiene copolymer rubber, polyisoprene rubber and butadiene-isoprene copolymer rubber, natural rubber, and the like. One or more of these rubbers are selected according to the purposes.

It is necessary that the rubber component contains at least 10% by weight, preferably at least 20 by weight, of the modified diene polymer. When the amount of the modified diene polymer is less than 10% by weight, the improvement in the impact resilience cannot be expected.

The Mooney viscosity ($ML_{1+4}100°$ C.) of the modified diene polymer is usually from 10 to 200, preferably from 20 to 150. When the Mooney viscosity is less than 10, the mechanical properties such as tensile strength are poor. When the Mooney viscosity is more than 200, the processability or workability is lowered since the compatibility with other rubbers is poor, and consequently the mechanical properties of the cured rubbers are lowered.

All or a part of the rubber component may be used as an oil extended rubber.

The rubber composition of the present invention is prepared by mixing the rubber component with various additives using a mixing machine such as a roll mill or a Banbury mixer. The additives used are not particularly limited, and are selected from additives usually used in the rubber industry, e.g. a curing system using sulfur, stearic acid, zinc oxide, a curing accelerator such as thiazole accelerator, thiuram accelerator or sulfenamide accelerator, and/or an organic peroxide; a reinforcing agent such as HAF carbon black, ISAF carbon black or other various grades of carbon blacks, or silica; a filler such as calcium carbontate or talc; and other additives such as process oil, processing assistant and antioxidant. The kinds and amounts of the rubber additives to be used are selected according to the purposes of the rubber composition, and are not particularly limited in the present invention.

The present invention is more specifically described and explained by means of the following Examples in which all percents and parts are by weight unless otherwise noted. It is to be understood that the present invention is not limited to these Examples.

EXAMPLE 1

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 6.0 millimoles of n-butyllithium dissolved in n-hexane. The polymerization was carried out at 50° C. for 1 hour with stirring.

After the completion of the polymerization, 0.75 millimole of silicon tetrachloride was added to the reaction mixture, and reacted at 50° C. for 30 minutes with stirring. Then, 1.5 millimoles of p-chloronitrobenzene was added to the reaction mixture. After conducting the reaction at 50° C. for 30 minutes with stirring, 10 ml of methanol was added to the reaction mixture and the mixture was further stirred for 5 minutes.

The reaction mixture was then taken out from the vessel. To the reaction mixture was added 5 g of 2,6-di-t-butyl-p-cresol (commercially available under the trademark "Sumilizer" BHT made by Sumitomo Chemical Co., Ltd.), and a large portion of n-hexane was evaporated followed by drying under reduced pressure at 60° C. for 24 hours.

The Mooney viscosity and the content of 1,2-bonding units (hereinafter referred to as "vinyl content") of the obtained elastomeric polymer were measured. The vinyl content was measured according to infrared spectrophotometry.

The produced polymer had a Mooney viscosity of 81 and a vinyl content of 70%.

COMPARATIVE EXAMPLE 1

The procedure of Example 1 was repeated except that silicon tetrachloride was not used and p-chloronitrobenzene was used in an amount of 3.0 millimoles.

The produced elastomeric polymer had a Mooney viscosity of 77 and a vinyl content of 70%.

COMPARATIVE EXAMPLE 2

The procedure of Example 1 was repeated except that silicon tetrachloride and p-chloronitrobenzene were not used.

The produced elastomeric polymer had a Mooney viscosity of 23 and a vinyl content of 70%.

COMPARATIVE EXAMPLE 3

The procedure of Example 1 was repeated except that silicon tetrachloride and p-chloronitrobenzene were not used and n-butyllithium was used in an amount of 3.9 millimoles instead of 6.0 millimoles.

The produced elastomeric polymer had a Mooney viscosity of 77 and a vinyl content of 70%.

EXAMPLE 2

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 5.0 millimoles of n-butyllithium dissolved in n-hexane. The polymerization was carried out at 50° C. for 1 hour with stirring.

After the completion of the polymerization, 0.61 millimole of tin tetrachloride was added to the reaction mixture and reacted at 50° C. for 30 minutes with stirring. Then, 2.5 millimoles of chloropicrin was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours The produced elastomeric polymer had a Mooney viscosity of 87 and a vinyl content of 70%.

COMPARATIVE EXAMPLE 4

The procedure of Example 2 was repeated except that tin tetrachloride was not used and chloropicrin was used in an amount of 5.0 millimoles.

The produced elastomeric polymer had a Mooney viscosity of 84 and a vinyl content of 70%.

COMPARATIVE EXAMPLE 5

The procedure of Example 2 was repeated except that tin tetrachloride and chloropicrin were not used.

The produced elastomeric polymer had a Mooney viscosity of 46 and a vinyl content of 70%.

COMPARATIVE EXAMPLE 6

The procedure of Example 2 was repeated except that tin tetrachloride and chloropicrin were not used and n-butyllithium was used in an amount of 3.8 millimoles instead of 5.0 millimoles.

The produced elastomeric polymer had a Mooney viscosity of 84 and a vinyl content of 70%.

EXAMPLE 3

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 6.4 millimoles of n-butyllithium dissolved in n-hexane. The polymerization was carried out at 50° C. for 1 hour with stirring.

After the completion of the polymerization, 0.73 millimole of silicon tetrachloride was added to the reaction mixture and reacted at 50° C. for 30 minutes with stirring. Then, 1.5 millimoles of dimethyl p-nitrophthalate was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 60 and a vinyl content of 70%.

COMPARATIVE EXAMPLE 7

The procedure of Example 3 was repeated except that silicon tetrachloride was not used and dimethyl p-nitrophthalate was used in an amount of 3.0 millimoles.

The produced elastomeric polymer had a Mooney viscosity of 56 and a vinyl content of 70%.

COMPARATIVE EXAMPLE 8

The procedure of Example 3 was repeated except that silicon tetrachloride and dimethyl p-nitrophthalate were not used.

The produced elastomeric polymer had a Mooney viscosity of 17 and a vinyl content of 70%.

COMPARATIVE EXAMPLE 9

The procedure of Example 3 was repeated except that silicon tetrachloride and dimethyl p-nitrophthalate were not used and n-butyllithium was used in an amount of 4.5 millimoles instead of 6.4 millimoles.

The produced elastomeric polymer had a Mooney viscosity of 56 and a vinyl content of 70%.

EXAMPLE 4

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 6.4 millimoles of n-butyllithium dissolved in n-hexane. The polymerization was carried out at 50° C. for 1 hour with stirring.

After the completion of the polymerization, 0.79 millimole of tin tetrachloride was added to the reaction mixture and reacted at 50° C. for 30 minutes with stirring. Then, 1.6 millimoles of p-chloronitrobenzene was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The Mooney viscosity, styrene content and vinyl content of the obtained elastomeric polymer were measured. The measurement of styrene content was made by a refractive index method.

The produced elastomeric polymer had a Mooney viscosity of 81, a styrene content of 25% and a vinyl content of 40%.

COMPARATIVE EXAMPLE 10

The procedure of Example 4 was repeated except that tin tetrachloride was not used and p-chloronitrobenzene was used in an amount of 3.2 millimoles.

The produced elastomeric polymer had a Mooney viscosity of 77, a styrene content of 25% and a vinyl content of 40%.

COMPARATIVE EXAMPLE 11

The procedure of Example 4 was repeated except that tin tetrachloride and p-chloronitrobenzene were not used.

The produced elastomeric polymer had a Mooney viscosity of 23, a styrene content of 25% and a vinyl content of 40%.

COMPARATIVE EXAMPLE 12

The procedure of Example 4 was repeated except that tin tetrachloride and p-chloronitrobenzene were not used and n-butyllithium was used in an amount of 4.0 millimoles instead of 6.4 millimoles.

The produced elastomeric polymer had a Mooney viscosity of 77, a styrene content of 25% and a vinyl content of 40%.

EXAMPLE 5

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 5.2 millimoles of n-butyllithium dissolved in n-hexane. The polymerization was carried out at 50° C. for 1 hour with stirring.

After the completion of the polymerization, 0.61 millimole of silicon tetrachloride was added to the reaction mixture and reacted at 50° C. for 30 minutes with stirring. Then, 2.6 millimoles of chloropicrin was added to the reaction mixture. AFter conducting the reaciton at 50° C. for 30 minutes with stirring, 10 ml of methanol was added and the reaction mixture was further sitrred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 87, a styrene content of 25% and a vinyl content of 40%.

COMPARATIVE EXAMPLE 13

The procedure of Example 5 was repeated except that silicon tetrachloride was not used and chloropicrin was used in an amount of 5.2 millimoles.

The produced elastomeric polymer had a Mooney viscosity of 84, a styrene content of 25% and a vinyl content of 40%.

COMPARATIVE EXAMPLE 14

The procedure of Example 5 was repeated except that silicon tetrachloride and chloropicrin were not used.

The produced elastomeric polymer had a Mooney viscosity of 46, a styrene content of 25% and a vinyl content of 40%.

COMPARATIVE EXAMPLE 15

The procedure of Example 5 was repeated except that silicon tetrachloride and chloropicrin were not used and n-butyllithium was used in an amount of 3.8 millimoles instead of 5.2 millimoles.

The produced elastomeric polymer had a Mooney viscosity of 84, a styrene content of 25% and a vinyl content of 40%.

EXAMPLE 6

A 10 liter stainless steel polymerization vessel was washed, dried and repalced with nitrogen, and it was charged with 750 g of 1,3-butadiene, 250 g of styrene, 4,300 g of n-hexane, 23 g of tetrahydrofuran and 7.2 millimoles of n-butyllithium dissolved in n-hexane. The polymerization was carried out at 50° C. for 1 hour with stirring.

After the completion of the polymerization 0.85 millimole of tin tetrachloride was added to the reaction mixture and the reaction was carried out at 50° C. for 30 minutes with stirring. Then, 1.8 millimoles of dimethyl p-nitrophthalate was added to the reaction mixture. After conducting hte reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large poriton of n-hexane was evaporated followed by drying under reduced pressure at 60° C. for 24 hours.

The produced elastomeric polymer had a Mooney viscosity of 59, a styrene content of 25% and a vinyl content of 40%.

COMPARATIVE EXAMPLE 16

The procedure of Example 6 was repeated except that tin tetrachloride was not used and dimethyl p-nitrophthalate was used in an amount of 3.6 millimoles.

The produced elastomeric polymer had a Mooney viscosity of 56, a styrene content of 25% and a vinyl content of 40%.

COMPARATIVE EXAMPLE 17

The procedure of Example 6 was repeated except that tin tetrachloride and dimethyl p-nitrophthalate were not used.

The produced elastomeric polymer had a mooney viscosity of 17, a styrene content of 25% and a vinyl content of 40%.

COMPARATIVE EXAMPLE 18

The procedure of Example 6 was repeated except that tin tetrachloride and dimethyl p-nitrophthalate were not used and n-butyllithium was used in an amount of 4.8 millimoles instead of 7.2 millimoles.

The produced elastomeric polymer had a Mooney viscosity of 56, a styrene cotnent of 25% and a vinyl content of 40%.

Preparation of compounded rubber and physical properties of cured rubber

A compounded rubber was prepared by mixing each of the polymers obtained in Examples 1 to 6 and Comparative Examples 1 to 18 with rubber additives on mixing rolls according to the recipe shown in Table 1. It was then press-cured at 160° C. for 30 minutes.

The impact resilience (rebound resilience) of the cured rubber was measured at 60° C. using a Lupke resilience tester.

The hardness (JIS A hardness) of the cured rubber was measured at −20° C. according to JIS K 6301.

Roll processability was measured as follows:

The temperature of 6 inch rolls was adjusted to 50° C., and the roll spacing as adjusted to 0.7, 1.0 or 2.0 mm. A polymer was wound round the roll, and the state of the polymer was observed and estimated according to the following criteria.

| Grade | State of polymer on roll |
|---|---|
| 5: | Winding state is very good, sheet skin is smooth and sheet has a stickiness. |
| 4: | Winding state is good, but sheet edge breaking occurs or biting into rolls in an early stage is somewhat late. |
| 3: | Rubber sheet wound on the roll is lacking in stickiness or biting into rolls of bank is somewhat bad. |
| 2: | Bagging and sheet breaking occur. |
| 1: | Biting into rolls in an early stage is bad, and the polymer is not formed into a sheet and does not wind round the roll. |

The results are shown in Table 2.

TABLE 1

| Ingredients | parts |
|---|---|
| Polymer | 100 |
| HAF carbon black*1 | 50 |
| Aromatic oil*2 | 20 |
| Zinc oxide | 4 |
| Stearic acid | 2 |
| Curing accelerator*3 | 1 |
| Sulfur | 1.6 |

(notes)
*1N-339
*2Aromatic oil having a flow point of 27° C.
*3N-cyclohexyl-2-benzothiazylsulfenamide tion mixture and the reaction was conducted at 50° C. for 30 minutes with stirring. Then, 2.4 millimoles of bis(dimethylamino)phosphoryl chloride was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 84 and a vinyl content of 70%.

COMPARATIVE EXAMPLE 19

The procedure of Example 7 was repeated except that silicon tetrachloride was not used and bis(dimethylamino)phosphoryl chloride was used in an amount of 4.7 millimoles.

The produced elastomeric polymer had a Mooney viscosity of 54 and a vinyl content of 70%.

COMPARATIVE EXAMPLE 20

The procedure of Example 7 was repeated except that silicon tetrachloride and bis(dimethylamino)phosphoryl chloride were not used.

The produced elastomeric polymer had a Mooney viscosity of 45 and a vinyl content of 70%.

COMPARATIVE EXAMPLE 21

The procedure of Example 8 was repeated except

TABLE 2

| | Silicon or tin compound | Nitro compound modifier | Mooney viscosity | Impact resilience (%) | JIS hardness | Roll processability |
|---|---|---|---|---|---|---|
| Example 1 | SiCl4 | p-chloronitrobenzene | 81 | 65 | 78 | 5 |
| Com.Ex.1 | — | p-chloronitrobenzene | 77 | 67 | 75 | 2 |
| Com.Ex.2 | — | — | 23 | 55 | 83 | 3 |
| Com.Ex.3 | — | — | 77 | 63 | 82 | 2 |
| Example 2 | SnCl4 | chloropicrin | 87 | 66 | 80 | 4 |
| Com.Ex.4 | — | chloropicrin | 84 | 68 | 78 | 2 |
| Com.Ex.5 | — | — | 46 | 59 | 83 | 3 |
| Com.Ex.6 | — | — | 84 | 64 | 81 | 2 |
| Example 3 | SiCl4 | dimethyl p-nitrophthalate | 60 | 62 | 81 | 5 |
| Com.Ex.7 | — | dimethyl p-nitrophthalate | 56 | 64 | 79 | 2 |
| Com.Ex.8 | — | — | 17 | 53 | 83 | 3 |
| Com.Ex.9 | — | — | 56 | 59 | 83 | 2 |
| Example 4 | SnCl4 | p-chloronitrobenzene | 81 | 61 | 79 | 5 |
| Com.Ex.10 | — | p-chloronitrobenzene | 77 | 63 | 77 | 2 |
| Com.Ex.11 | — | — | 23 | 52 | 85 | 3 |
| Com.Ex.12 | — | — | 77 | 59 | 84 | 2 |
| Example 5 | SiCl4 | chloropicrin | 87 | 62 | 82 | 4 |
| Com.Ex.13 | — | chloropicrin | 84 | 64 | 80 | 2 |
| Com.Ex.14 | — | — | 46 | 55 | 85 | 3 |
| Com.Ex.15 | — | — | 84 | 60 | 83 | 2 |
| Example 6 | SnCl4 | dimethyl p-nitrophthalate | 59 | 58 | 83 | 5 |
| Com.Ex.16 | — | dimethyl p-nitrophthalate | 56 | 60 | 81 | 2 |
| Com.Ex.17 | — | — | 17 | 60 | 87 | 3 |
| Com.Ex.18 | — | — | 56 | 56 | 85 | 2 |

EXAMPLE 7

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 4.7 millimoles of n-butyllithium dissolved in n-hexane. The polymerization was carried out at 50° C. for 1 hour with stirring.

After the completion of the polymerization, 0.58 millimole of silicon tetrachloride was added to the reacthat silicon tetrachloride and bis(dimethylamino)phosphoryl chloride were not used and n-butyllithium was used in an amount of 4.4 millimoles instead of 4.7 millimoles.

The produced elastomeric polymer had a Mooney viscosity of 54 and a vinyl content of 70%.

EXAMPLE 8

A 10 liter stainless steel polymerization vessel was washed, dried and replaced with nitrogen, and it was charged with 750 g of 1,3-butadiene, 250 g of styrene, 4,300 g of n-hexane, 23 g of tetrahydrofuran and 5.2 millimoles of n-butyllithium dissolved in n-hexane. The polymerization was carried out at 50° C. for 1 hour with stirring.

After the completion of the polymerization, 0.55 millimole of tin tetrachloride was added to the reaction mixture and the reaction was conducted at 50° C. for 30 minutes with stirring. Then, 2.6 millimoles of bis(dimethylamino)phosphoryl chloride was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced polymer had a Mooney viscosity of 84, a styrene content of 25% and a vinyl content of 40%.

COMPARATIVE EXAMPLE 22

The procedure of Example 8 was repeated except that tin tetrachloride was not used and bis(dimethylamino)phosphoryl chloride was used in an amount of 5.2 millimoles.

The produced polymer had a Mooney viscosity of 54, a styrene content of 25% and a vinyl content of 40%.

COMPARATIVE EXAMPLE 23

The procedure of Example 8 was repeated except that tin tetrachloride and bis(dimethylamino)phosphoryl chloride were not used.

The produced polymer had a Mooney viscosity of 45, a styrene content of 25% and a vinyl content of 40%.

COMPARATIVE EXAMPLE 24

The procedure of Example 8 was repeated except that tin tetrachloride and bis(dimethylamino)phosphoryl chloride were not used and n-butyllithium was used in an amount of 4.9 millimoles instead of 5.2 millimoles.

The produced polymer had a Mooney viscosity of 54, a styrene content of 25% and a vinyl content of 40%.

Using the polymers obtained in Examples 7 and 8 and Comparative Examples 19 to 24, the preparation of compounded rubbers, curing thereof and measurement of physical properties of the cured products were made in the same manner as in Examples 1 to 6.

The results are shown in Table 3.

4.5 millimoles of n-butyllithium dissolved in n-hexane. The polymerization was carried out at 50° C. for 1 hour with stirring.

After the completion of the polymerization, 0.56 millimole of silicon tetrachloride was added to the reaction mixture and the reaction was carried out at 50° C. for 30 minutes with stirring. Then, 2.3 millimoles of 3-dimethylaminopropyldiethoxymethylsilane was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced polymer had a Mooney viscosity of 90 and a vinyl content of 70%.

COMPARATIVE EXAMPLE 25

The procedure of Example 9 was repeated except that silicon tetrachloride was not used and 3-dimethylaminopropyldiethoxymethylsilane was used in an amount of 4.5 millimoles.

The produced polymer had a Mooney viscosity of 58 and a vinyl content of 70%.

COMPARATIVE EXAMPLE 26

The procedure of Example 9 was repeated except that silicon tetrachloride and 3-dimethylaminopropyldiethoxymethylsilane were not used.

The produced polymer had a Mooney viscosity of 58 and a vinyl content of 70%

EXAMPLE 10

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and 4.7 millimoles of n-butyllithium dissolved in n-hexane. The polymerization was carried out at 50° C. for 1 hour with stirring.

After the completion of the polymerization, 0.60 millimole of tin tetrachloride was added to the reaction mixture and the reaction was conducted at 50° C. for 30 minutes with stirring. Then, 2.4 millimoles of 3-dimethylaminopropyldiethoxymethylsilane was added to the reaction mixture. After conducting the reaction for 30 minutes with stirring, 10 ml of methanol was added and

TABLE 3

| | Silicon or tin compound | Modifier | Mooney viscosity | Impact resilience (%) | JIS hardness | Roll processability |
|---|---|---|---|---|---|---|
| Example 7 | SiCl₄ | bis(dimethylamino)phosphoryl chloride | 84 | 63 | 80 | 4 |
| Com.Ex.19 | — | bis(dimethylamino)phosphoryl chloride | 54 | 66 | 78 | 2 |
| Com.Ex.20 | — | — | 45 | 56 | 84 | 2 |
| Com.Ex.21 | — | — | 54 | 57 | 83 | 2 |
| Example 8 | SnCl₄ | bis(dimethylamino)phosphoryl chloride | 84 | 66 | 78 | 4 |
| Com.Ex.22 | — | bis(dimethylamino)phosphoryl chloride | 54 | 63 | 79 | 2 |
| Com.Ex.23 | — | — | 45 | 54 | 85 | 2 |
| Com.Ex.24 | — | — | 54 | 55 | 84 | 2 |

EXAMPLE 9

A 10 liter stainless steel polymerization vessel was washed, dried and replaced with nitrogen, and it was charged with 1,000 g of 1,3-butadiene, 4,300 g of n-hexane, 40 millimoles of ethylene glycol diethyl ether and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced polymer had a Mooney viscosity of 90, a styrene content of 25% and a vinyl content of 40%.

COMPARATIVE EXAMPLE 27

The procedure of Example 10 was repeated except that tin tetrachloride was not used and 3-dimethylaminopropyldiethoxymethylsilane was used in an amount of 4.7 millimoles.

The produced polymer had a Mooney viscosity of 58, a styrene content of 25% and a vinyl content of 40%.

COMPARATIVE EXAMPLE 28

The procedure of Example 10 was repeated except that tin tetrachloride and 3-dimethylaminopropyldiethoxymethylsilane were not used.

The produced polymer had a Mooney viscosity of 58, a styrene content of 25% and a vinyl content of 40%.

Using the polymers obtained in Examples 9 and and Comparative Examples 25 to 28, the preparation of compounded rubbers, curing thereof and measurement of physical properties of the cured products were made in the same manner as in Examples 1 to 6.

The results are shown in Table 4.

COMPARATIVE EXAMPLE 30

The procedure of Example 11 was repeated except that silicon tetrachloride and N,N-dimethylaminopropyl acrylamide were not used and n-butyllithium was used in an amount of 4.3 millimoles.

The produced elastomeric polymer had a Mooney viscosity of 61, a styrene content of 15% and a vinyl content of 31%.

EXAMPLE 12

A 10 liter stainless steel polymerization vessel was washed, dried and replaced with nitrogen, and it was charged with 850 g of 1,3-butadiene, 150 g of styrene, 4,300 g of n-hexane, 9 g of tetrahydrofuran and 6.3 millimoles of n-butyllithium dissolved in n-hexane. The polymerization was carried out at 50° C. for 1 hour with stirring.

After the completion of the polymerization, 0.4 millimole of tin tetrachloride was added to the reaction mixture and the reaction was carried out at 50° C. for 30 minutes with stirring. Then, 3.2 millimoles of N,N-dimethylaminopropylacrylamide was added to the reaction mixture. After conducting the reaction for 30 minutes with stirring, 10 ml of methanol was added and the reaction mixture was further stirred for 5 minutes.

TABLE 4

| | Silicon or tin compound | Modifier | Mooney viscosity | Impact resilience (%) | JIS hardness | Roll processability |
|---|---|---|---|---|---|---|
| Example 9 | SiCl$_4$ | 3-dimethylaminopropyldiethoxymethylsilane | 90 | 63 | 82 | 4 |
| Com.Ex.25 | — | 3-dimethylaminopropyldiethoxymethylsilane | 58 | 65 | 79 | 2 |
| Com.Ex.26 | — | — | 58 | 58 | 85 | 2 |
| Example 10 | SnCl$_4$ | 3-dimethylaminopropyldiethoxymethylsilane | 90 | 67 | 79 | 4 |
| Com.Ex.27 | — | 3-dimethylaminopropyldiethoxymethylsilane | 58 | 63 | 80 | 2 |
| Com.Ex.28 | — | — | 58 | 55 | 86 | 2 |

EXAMPLE 11

A 10 liter stainless steel polymerization vessel was washed, dried and replaced with nitrogen, and it was charged with 850 g of 1,3-butadiene, 150 g of styrene, 4,300 g of n-hexane, 9 g of tetrahydrofuran and 6.3 millimoles of n-butyllithium dissolved in n-hexane. The polymerization was carried out at 50° C. for 1 hour with stirring. After the completion of the polymerization, 0.40 millimole of silicon tetrachloride was added to the reaction mixture and the reaction was carried out at 50° C. for 30 minutes with stirring. Then, 3.2 millimoles of N,N-dimethylaminopropyl acrylamide was added to the reaction mixture. After conducting the reaction at 50° C. for 30 minutes with stirring, 10 ml of methanol was added to the reaction mixture and the mixture was further stirred for 5 minutes. The reaction mixture was then taken out from the vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours. The produced polymer had a Mooney viscosity of 61, a styrene content of 15% and a vinyl content of 31%.

COMPARATIVE EXAMPLE 29

The procedure of Example 11 was repeated except that silicon tetrachloride was not used, and 4.3 millimoles of N,N-dimethylaminopropyl acrylamide and 4.3 millimoles of n-butyllithium were used. The produced elastomeric polymer had a Mooney viscosity of 61, a styrene content of 15% and a vinyl content of 31%.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 72, a styrene content of 15% and a vinyl content of 31%.

COMPARATIVE EXAMPLE 31

The procedure of Example 12 was repeated except that tin tetrachloride was not used, and N,N-dimethylaminopropylacrylamide and n-butyllithium were used in amounts of 4.1 millimoles and 4.1 millimoles, respectively.

The produced elastomeric polymer had a Mooney viscosity of 72, a styrene content of 15% and a vinyl content of 31%.

EXAMPLE 13

A 10 liter stainless steel polymerization vessel was washed, dried and replaced with nitrogen, and it was charged with 850 g of 1,3-butadiene, 150 g of styrene, 4,300 g of n-hexane, 9 g of tetrahydrofuran and 4.4 millimomoles of n-butyllithium dissolved in n-hexane. The polymerization was carried out at 50° C. for 1 hour with stirring.

After the completion of the polymerization, 0.55 millimole of silicon tetrachloride was added to the reaction mixture and the reaction was conducted at 50° C. for 30 minutes with stirring. Then, 2.2 millimoles of bis(dimethylamino)methylvinylsilane was added to the reaction mixture. After conducting the reaction at 50° C. for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 85, a styrene content of 15% and a vinyl content of 31%.

COMPARATIVE EXAMPLE 32

The procedure of Example 12 was repeated except that tin tetrachloride and N,N-dimethylaminopropyl acrylamide were not used and n-butyllithium was used in an amount of 4.1 millimoles.

The produced elastomeric polymer had a Mooney viscosity of 72, a styrene content of 15% and a vinyl content of 31%.

COMPARATIVE EXAMPLE 33 the procedure of Example 13 was repeated except that silicon tetrachloride was not used and bis(dimethylamino)methylvinylsilane was used in an amount of 4.4 millimoles.

The produced elastomeric polymer had a Mooney viscosity of 72, a styrene content of 15% and a vinyl content of 31%.

COMPARATIVE EXAMPLE 34

The procedure of Example 13 was repeated except that silicon tetrachloride and bis(dimethylamino)methylvinylsilane were not used.

The produced elastomeric polymer had a Mooney viscosity of 55, a styrene content of 15% and a vinyl content of 31%.

COMPARATIVE EXAMPLE 35

The procedure of Example 13 was repeated except that silicon tetrachloride and bis(dimethylamino)methylvinylsilane were not used and n-butyllithium was used in an amount of 4.1 millimoles instead of 4.4 millimoles.

The produced elastomeric polymer had a Mooney viscosity of 72, a styrene content of 15% and a vinyl content of 31%.

EXAMPLE 14

A 10 liter stainless steel polymerization vessel was washed, dried and replaced with nitrogen, and it was charged with 850 g of 1,3-butadiene, 150 g of styrene, 4,300 g of n-hexane, 9 g of tetrahydrofuran and 4.4 millimoles of n-butyllithium dissolved in n-hexane. The polymerization was carried out at 50° C. for 1 hour with stirring.

After the completion of the polymerization, 0.55 millimole of tin tetrachloride was added to the reaction mixture and the reaction was conducted at 50° C. for 30 minutes with stirring. Then, 2.2 millimoles of bis(dimethylamino)methylvinylsilane was added to the reaction mixture. After conducting the reaction for 30 minutes with stirring, 10 ml of methanol was added and the reaction mixture was further stirred for 5 minutes.

The reaction mixture was then taken out from the polymerization vessel. To the reaction mixture was added 5 g of 2,6-di-t-butyl-p-cresol (Sumilizer ® BHT), and a large portion of n-hexane was evaporated followed by drying under reduced pressure at 60° C. for 24 hours.

The produced elastomeric polymer had a Mooney viscosity of 85, a styrene content of 15% and a vinyl content of 31%.

COMPARATIVE EXAMPLE 36

The procedure of Example 14 was repeated except that tin tetrachloride was not used and bis(dimethylamino)methylvinylsilane was used in an amount of 4.4 millimoles.

The produced elastomeric polymer had a Mooney viscosity of 72, a styrene content of 15% and a vinyl content of 31%.

COMPARATIVE EXAMPLE 37

The procedure of Example 14 was repeated except that tin tetrachloride and bis(dimethylamino)methylvinylsilane were not used.

The produced elastomeric polymer had a Mooney viscosity of 55, a styrene content of 15% and a vinyl content of 31%.

COMPARATIVE EXAMPLE 38

The procedure of Example 14 was repeated except that tin tetrachloride and bis(dimethylamino)methylvinylsilane were not used and n-butyllithium was used in an amount of 4.1 millimoles instead of 4.4 millimoles.

The produced elastomeric polymer had a Mooney viscosity of 72, a styrene content of 15% and a vinyl content of 31%.

The results of the measurement of properties of the cured products prepared in the same manner as in Examples 1 to 6 from the polymers obtained in Examples 11 to 14 and Comparative Examples 29 to 38 are shown in Table 5.

TABLE 5

| | Silicon or tin compound | Modifier | Mooney viscosity | Impact resilience (%) | JIS hardness | Roll processability |
| --- | --- | --- | --- | --- | --- | --- |
| Example 11 | SiCl$_4$ | N,N-dimethylaminopropyl acrylamide | 61 | 66 | 70 | 5 |
| Com.Ex.29 | — | N,N-dimethylaminopropyl acrylamide | 61 | 68 | 70 | 3 |
| Com.Ex.30 | — | — | 61 | 65 | 72 | 3 |
| Example 12 | SnCl$_4$ | N,N-dimethylaminopropyl acrylamide | 72 | 69 | 69 | 5 |
| Com.Ex.31 | — | N,N-dimethylaminopropyl acrylamide | 72 | 69 | 70 | 3 |
| Com.Ex.32 | — | — | 72 | 66 | 72 | 3 |
| Example 13 | SiCl$_4$ | bis(dimethylamino)methylvinylsilane | 85 | 67 | 70 | 4 |
| Com.Ex.33 | — | bis(dimethylamino)methylvinylsilane | 72 | 69 | 69 | 2 |
| Com.Ex.34 | — | — | 55 | 62 | 73 | 3 |
| Com.Ex.35 | — | — | 72 | 65 | 72 | 2 |
| Example 14 | SnCl$_4$ | bis(dimethylamino)methylvinylsilane | 85 | 70 | 68 | 4 |
| Com.Ex.36 | — | bis(dimethylamino)methylvinylsilane | 72 | 69 | 69 | 2 |
| Com.Ex.37 | — | — | 55 | 62 | 73 | 3 |

TABLE 5-continued

| | Silicon or tin compound | Modifier | Mooney viscosity | Impact resilience (%) | JIS hardness | Roll processability |
|---|---|---|---|---|---|---|
| Com.Ex.38 | — | — | 72 | 65 | 72 | 2 |

From the results shown in Tables 2 to 5, it is understood that the polymers prepared according to the present invention have a high impact resilience and a low hardness at low temperatures and moreover have an excellent processability.

In addition to the ingredients used in the Examples, other ingredients can be used in the Examples as set forth in the specification to obtain substantially the same results.

What we claim is:

1. A process for preparing a modified diene polymer which comprises reacting an alkali metal-containing conjugated diene polymer with (a) a silicon or tin compound of the formula: $R_aMX_b$ wherein R is an alkyl group having 1 to 4 carton atoms, M is a silicon atom or a tin atom, X is a halogen atom, a is 0, 1 or 2 and b is 2, 3 or 4, and an acrylamide compound of the formula (3):

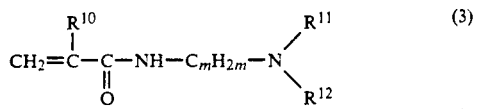 (3)

wherein $R^{10}$ is a hydrogen atom or a methyl group, $R^{11}$ and $R^{12}$ are each an alkly group having 1 to 4 carbon atoms, and m is an integer;

said alkali metal-containing conjugated diene polymer being a living polymer having an alkali metal end prepared by a polymerization of a conjugated diene monomer or a mixture of a conjugated diene monomer and an aromatic vinyl monomer in a hydrocarbon solvent in the presence of an alkali metal-based catalyst, or a diene polymer to which an alkali metal is introduced by an addition reaction of a diene polymer having conjugated diene units in the polymer chain and an alkali metal-based catalyst in a hydrocarbon solvent.

2. The process of claim 1, wherein said compound (a) is at least one member selected from the group consisting of silicon tetrachloride, silicon tetrabromide, trichloromethylsilane, trichlorobutylsilane, dichlorodimethylsilane, 1,2-bis(trichlorosilyl)ethane, tin tetrachloride, tin tetrabromide, methyltin trichloride, butyltin trichloride, tin dichloride, and bistrichlorosilyltin.

3. The process of claim 1, wherein said alkali metal-containing conjugated diene polymer is first reacted with said compound (a) and then with said compound (b).

4. The process of claim 1, wherein said alkali metal-based catalyst is a member selected from the group consisting of an alkali metal, an alkali metal hydrocarbon compound and a complex of an alkali metal with a polar compound.

5. The process of claim 1, wherein said alkali metal-containing conjugated diene polymer is in the form of a solution in a hydrocarbon solvent.

6. A rubber composition comprising a rubber component containing at least 10% by weight of a modified diene polymer and rubber additives, said modified diene polymer being a conjugated diene polymer modified by reacting an alkali metal-containing conjugated diene polymer selected from the group consisting of a conjugated diene polymer having an active metal end and an alkali metal addition product of a conjugated diene polymer with (a) a silicon or tin compound of the formula: $R_aMX_b$ wherein R is an alkyl group having 1 to 4 carbon atoms, M is a silicon atom or a tin atom, X is a halogen atom, a is 0, 1 or 2 and b is 2, 3 or 4, and (b)

an acrylamide compound of the formula (3):

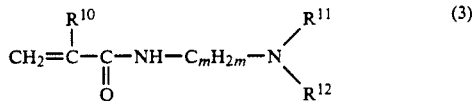 (3)

wherein $R^{10}$ is a hydrogen atom or a methyl group, $R^{11}$ and $R^{12}$ are each an alkly group having 1 to 4 carbon atoms, and m is an integer;

* * * * *

UNITED STATES PATENT AND TRADEMARK OFFICE
CERTIFICATE OF CORRECTION

PATENT NO. : 5,128,416

DATED : July 7, 1992

INVENTOR(S) : IMAI et al

It is certified that error appears in the above-identified patent and that said Letters Patent is hereby corrected as shown below:

Column 3, line 22, "con3ugated" should read --conjugated--.

Column 5, line 14, "compounds" should read --compound--.

Column 5, line 20, "," should read --;--.

Column 5, line 38, after "(3)" insert --:--.

Column 8, line 39, after "thereof" insert --.--.

Column 15, line 59, "EXAMPLE 71" should read --EXAMPLE 7--.

Column 23, line 23, after "and" insert --(b)--.

Signed and Sealed this

Seventh Day of September, 1993

Attest:

BRUCE LEHMAN

Attesting Officer

Commissioner of Patents and Trademarks